US008229232B2

(12) United States Patent
Gross et al.

(10) Patent No.: US 8,229,232 B2
(45) Date of Patent: Jul. 24, 2012

(54) COMPUTER VISION-BASED METHODS FOR ENHANCED JBIG2 AND GENERIC BITONAL COMPRESSION

(75) Inventors: Ari David Gross, West Hempstead, NY (US); Raphael Meyers, Long Beach, NY (US); Navdeep Tinna, Mississauga (CA)

(73) Assignee: CVision Technologies, Inc., Forest Hills, NY (US)

( * ) Notice: Subject to any disclaimer, the term of this patent is extended or adjusted under 35 U.S.C. 154(b) by 982 days.

(21) Appl. No.: 12/198,055

(22) Filed: Aug. 25, 2008

(65) Prior Publication Data
US 2009/0052786 A1 Feb. 26, 2009

Related U.S. Application Data

(60) Provisional application No. 60/996,094, filed on Aug. 24, 2007.

(51) Int. Cl.
*G06K 9/36* (2006.01)

(52) U.S. Cl. ...................................................... 382/232

(58) Field of Classification Search .................. 382/128, 382/131, 132, 232
See application file for complete search history.

(56) References Cited

U.S. PATENT DOCUMENTS

2006/0170944 A1* 8/2006 Arps et al. .................... 358/1.13
2006/0280348 A1* 12/2006 Smith et al. .................... 382/128

* cited by examiner

*Primary Examiner* — Claire X Wang
(74) *Attorney, Agent, or Firm* — Kenyon & Kenyon LLP

(57) ABSTRACT

A system and method of symbol matching may include a processor configured to determine which pixels of a first symbol are tangent pixels; for each of the determined tangent pixels, determine whether a second symbol includes a pixel corresponding to the tangent pixel that includes at least one same tangent constraint as that of the tangent pixel; accept the first and second symbols as a match based on shared tangent constraints conditional upon a determination that the second symbol includes for each of at least a subset of the tangent pixels of the first symbol a corresponding pixel that includes the at least one same tangent constraint as that of the tangent pixel; and generate a document including a single symbol that is mapped to the first and second symbols.

20 Claims, 5 Drawing Sheets

BB  BB          BB  BB
BB  BB          BB  BB
BB  BB          BB  BB
 B  B            BXB

Figure 2        Figure 3

BB              BB
BB              BBX
BB              BBX
BB              BB
BB              BB
BB              BB

Figure 4        Figure 5

BB              BB
BBB             BBBX
BB              BB
BB              BB
BB              BB
BB              BB

Figure 6        Figure 7

OOO         B
BXO         BX         BX
BBB         BBB        BB

Figure 8    Figure 9    Figure 10

```
BB          BB
BB          BB          OOBBOO
BBX         BBBX        OBBBXO
BB          BB          OOBBOO
BB          BB
```

Figure 11      Figure 12      Figure 13

BBBBB          BBBB
BBBBX          BBBX
BBBX           BBBX
BBX            BBBX
BBB            BBBB

Figure 14      Figure 15

COMPUTER VISION-BASED METHODS FOR ENHANCED JBIG2 AND GENERIC BITONAL COMPRESSION

CROSS-REFERENCE TO RELATED APPLICATIONS

This application claims priority to U.S. Provisional Patent Application No. 60/966,094, filed Aug. 24, 2007, entitled "Computer Vision-Based Methods For Enhanced JBIG2 And Generic Bitonal Compression," which is herein incorporated by reference in its entirety.

FIELD OF THE INVENTION

The present invention relates to a system and method of bitonal image compression using human perception modeling.

BACKGROUND INFORMATION

Conventional data compression methods analyze pixels of a file to determine which glyphs composed of sets of the turned on pixels (e.g., black pixels) are matches. They then proceed to associate the matched glyphs (alternatively referred to as nodes, connected components, cc's, or bitmaps) with a common model. When comparing two matching functions (also referred to herein as "matchers"), one can be described as a tighter matcher if it is stricter with respect to which fonts it allows to be matched, while the other can be described as looser if it is more lenient in this regard. For example, a Hausdorff matcher requires that every black pixel (e.g., position {x, y}) on a first bitmap must find a corresponding black pixel on a second bitmap to which the first is compared within a pixel distance of one. A Rank 95 Hausdorff requires that 95% of the black pixels find a corresponding black pixel within a distance of one. A Rank 95 Hausdorff matcher is therefore looser than a Hausdorff matcher. A Quadrant Hausdorff matcher requires that every black pixel finds a corresponding black pixel within distance one in the same quadrant direction. (See U.S. Pat. No. 6,748,115 FIGS. 9 & 10 for an illustration.) Every black pixel in the first bitmap which does not find a matching pixel in the same exact position of the corresponding bitmap, must find a matching pixel in the same quadrant. For example, if all such pixels find a match in the top right quadrant, the bitmaps match. However, if there exists a pixel which needs to find support in a different quadrant such as the bottom left, the match would not be allowed. A Quadrant Hausdorff matcher is tighter than a Hausdorff matcher, as it imposes an additional directional constraint. Applying a looser matcher may result in fewer models overall, but increase the likelihood of a mismatch; applying a tighter matcher may result in more font models overall, but decrease the likelihood of a mismatch.

Most JBIG2 implementations will generally use a range of matchers, depending on the properties of the bitmaps being compared. These properties may include the height, width, area, the number of holes in the bitmap, and mean stroke thickness of the bitmaps. If the bitmaps are large and have a wide mean stroke thickness, they can generally be safely matched with a loose matcher such as a Rank 95 Hausdorff. If the bitmaps are smaller and thinner, they will be more likely to need a tighter matcher such as a Quadrant Hausdorff.

However, a general tradeoff in the field of data compression is rate vs. distortion, i.e., the higher the compression rate, the greater the amount of distortion. In fact, the tradeoff, referred to herein as "rate distortion theory," is a major branch of information theory, the problem of determining the minimal amount of entropy (information) R that should be communicated over a channel, so that the source (input signal) can be approximately reconstructed at the receiver (output signal) without exceeding a given distortion D.

Rate distortion theory, created by Claude Shannon in his foundational work on information theory, gives theoretical bounds for how much compression can be achieved using lossy data compression methods. Many of the existing audio, speech, image, and video compression techniques have transforms, quantization, and bit-rate allocation procedures that capitalize on the general curve of the rate-distortion functions.

In rate distortion theory, the rate is the number of bits per data sample to be stored or transmitted. The notion of distortion is a subject of on-going discussion. In the most simple case (which is actually used in most cases), the distortion is defined as the variance or the means squared error of the difference between input and output signal. However, since most lossy compression techniques operate on data, e.g., music, pictures, video, that will be perceived by humans, the distortion measure preferably should include some aspects of human perception. Audio compression perceptual models, and therefore perceptual distortion measures, are relatively well developed and routinely used in compression techniques such as MP3, but are often not easy to include in rate distortion theory, i.e., calculation of the degree of distortion is difficult when perception models are used. In image and video compression, the human perception models are less well developed and inclusion is mostly limited to the JPEG and MPEG weighting (quantization) matrices.

Shannon's rate distortion theory notwithstanding, there does not seem to be an inherent tradeoff between rate and distortion. For example, in the lossless data compression domain, studies have shown that human entropy for English language text is about 1 bit per character (bpc), (i.e., a probability of a human to correctly guess a next character corresponds to a probability for which only 1 bit per character would be required for the encoding.) Traditional lossless text compression based on Lempel-Ziv methods (e.g., zip) has a compression rate of about 2 bpc. Newer lossless text compression methods that utilize techniques including arithmetic encoding and Markov models (of order statistics), such as PPMD, achieve a compression rate of approximately 1.5 bpc, which is closer to, but still higher than, human entropy rates of roughly 1.1 bpc. These improvements in lossless text compression rates, achieved over a 20 year period, did not come at a cost of greater data distortion since both zip and prediction-by-partial-matching (ppm) methods are entirely lossless. To the contrary, PPMD is a better model for text than the traditional lossless text compression methods, and better modeling yields a better representation or understanding of the data, and consequently, achieves lower entropy.

Modeling human perception is a very effective tool for efficient data compression methods. Although modeling human perception has been very important in areas like computer vision for a long time, it has generally played a very tangential role in data compression. Human perception models have evolved over time and seem to be highly effective. Rather than perceive things at a sensor level, e.g., pixels, perception is done at an object level. This has the positive effect of separating out signal from noise, as well as greatly reducing the amount of information that needs to be retained.

For example, a color image scan at 300 dots per inch (dpi) might typically involve 300*300 (pixels per square inch) *8.5*11 (paper size in inches)*24 (bits per pixels) equal to approximately 202 million bits of information (202 Mb). A standard compression method would involve finding ways to save this information, i.e., 202 million pieces of information, with a minimal file size and minimal distortion (variance) between the input and output signals. Nowhere in typical image compression algorithms is "scene understanding" an essential, or even important, component. Human perception works very differently: first there is an understanding of the general scene (e.g., indoor, outdoor, document, invoice document, etc.). Once the scene is understood on some basic level (e.g., frame instantiation as defined by Patrick Winston), the image is grouped or segmented into objects, of which there are very few compared to the number of pixels and corresponding bits. For example, if a color image has over 200 million bits of information, a human may typically perceive many fewer objects, perhaps less than one hundred. For a bitonal image scan, a typical compression algorithm (e.g., CCITT4) views the problem as storing 8 million pieces of data (pixels or bits), while a system using human perception models, referred to herein as a human system, perceives the problem as understanding 500-2000 character symbols or connected components.

Perceptually lossless image compression is about image understanding. The fundamental tenet in perceptually lossless image compression is to model human perception as closely as possible. Human perception models for speech, image, and video are typically much more advanced than standard computer models used in compression and other fields that do not attempt to model human perception. As such, perceptually lossless compression can achieve much lower rates of compression, ideally with NO perceptual distortion. On the other hand, a disadvantage of such perceptual methods is that they are domain specific, so that different techniques are used, for example, in image compression, speech compression, and video compression.

SUMMARY

Embodiments of the present invention provide a system and method for compressing bimodal image documents in a manner that approximates human visual methods. With respect to JBIG2 compression, a matcher may represent a document image as a set of components, rather than as a set of pixels. This may typically reduce the number of objects from 8 million pixels to fewer than 3,000 components per page. These components themselves may generally be digitized elements within some font library, rather than random components. The system and method may match similar components together, just as the human visual system, i.e., the perception of the human mind, would at some point group together similar font components, even if the base language were otherwise unknown, and keep track of them internally by referencing the same data representation. The system and method of the present invention may group together sequences of models to form composites, where a composite model in JBIG2 is a series of individual models that follow one another in a series.

JBIG2 encoding may use pattern matching and substitution methods, where multiple instances of the same font in the original image are all placed into the same class and associated with a single model and are accordingly represented by the same bitmap in the encoded image. The system and method of the present invention may implement a matching function to determine if two fonts are the same, where different types of matching functions are used depending on the situation. Failure to match two fonts which can be safely merged may result in additional models, which may increase file size. On the other hand, mistakenly matching two fonts which should be kept separate can result in visible distortion in the encoded image. The system and method of the present invention may approximate human performance, merging all nodes that are instantiations of the same symbolic font model as determined on a component level rather than a pixel level, without ever merging two distinct node classes together for association with a single model when they are not instantiations of the same symbolic font.

In an example embodiment of the present invention, the compression system and method may group symbolic sequences together, for example, just like the human visual system is adept with grouping together symbolic strings and storing them as a single entity, such as words, which may afford greater compression and may lead to word-based JBIG2 coding. The system and method of the present invention may include context-sensitive matching, akin to human learning. In this framework, given a particular set of matching functions, the system and method of the present invention may match two glyphs (alternatively referred to as nodes, connected components or cc's) that might otherwise not be considered a match when they are not provided in the same context. Two glyphs may have the same context when one or more of their respective neighbors belong to the same model class.

Example embodiments of the present invention provide enhancements to the art of bitonal image compression in several different areas. These areas include improved shape matching and segmentation methods.

Example embodiments of the present invention provide improved shape matching methods, consistent with human perception, that result in virtually no model fragmentation (redundant models) or mismatches. In addition to new matchers, example embodiments of the present invention provide new methods for determining when a looser matcher can be safely used. Example embodiments of the present invention also provide fast (approximate) methods to construct graphs, image grids, and other data structures that are very useful for computing shape similarity, a significant aspect of efficient JBIG2 compression. Example embodiments of the present invention provide improved techniques for efficient lossless bitmap encoding using these shape similarity data structures, e.g., a shape-based approximate min spanning forest.

Segmentation is a significant aspect of efficient compression, both bitonal and color. Example embodiments of the present invention provide numerous segmentation enhancements, including picture extraction and text region grouping, all akin to human perceptual segmentation processes, and other bitonal compression enhancements, such as improved JBIG2 addressing using vertical padding and improved image processing methods for grouping together connected components.

BRIEF DESCRIPTION OF THE DRAWINGS

FIGS. 2 to 7 show pairs of bitmaps that include minor variations which may be treated significantly by a tangent matcher, according to an example embodiment of the present invention.

FIG. 8 shows a bitmap including an on pixel having a tangent support used as a criterion by a neighbor-supported tangent matcher, according to an example embodiment of the present invention.

FIGS. 9 and 10 show a pair of bitmaps having structures with different degrees of sharpness, which may be used by feature-based matcher to apply different matching criteria, according to an example embodiment of the present invention.

FIGS. 11 and 12 show bitmaps treated differently based on differences with respect to symmetry, according to an example embodiment of the present invention.

FIG. 13 shows a bitmap with additional white pixels which may be analyzed by a symmetry matcher, according to an example embodiment of the present invention.

FIGS. 14 and 15 show bitmaps sharing local tangent directions but for which a match determination may be rejected by a curvature-based matcher, according to an example embodiment of the present invention.

DETAILED DESCRIPTION

Figure 1:
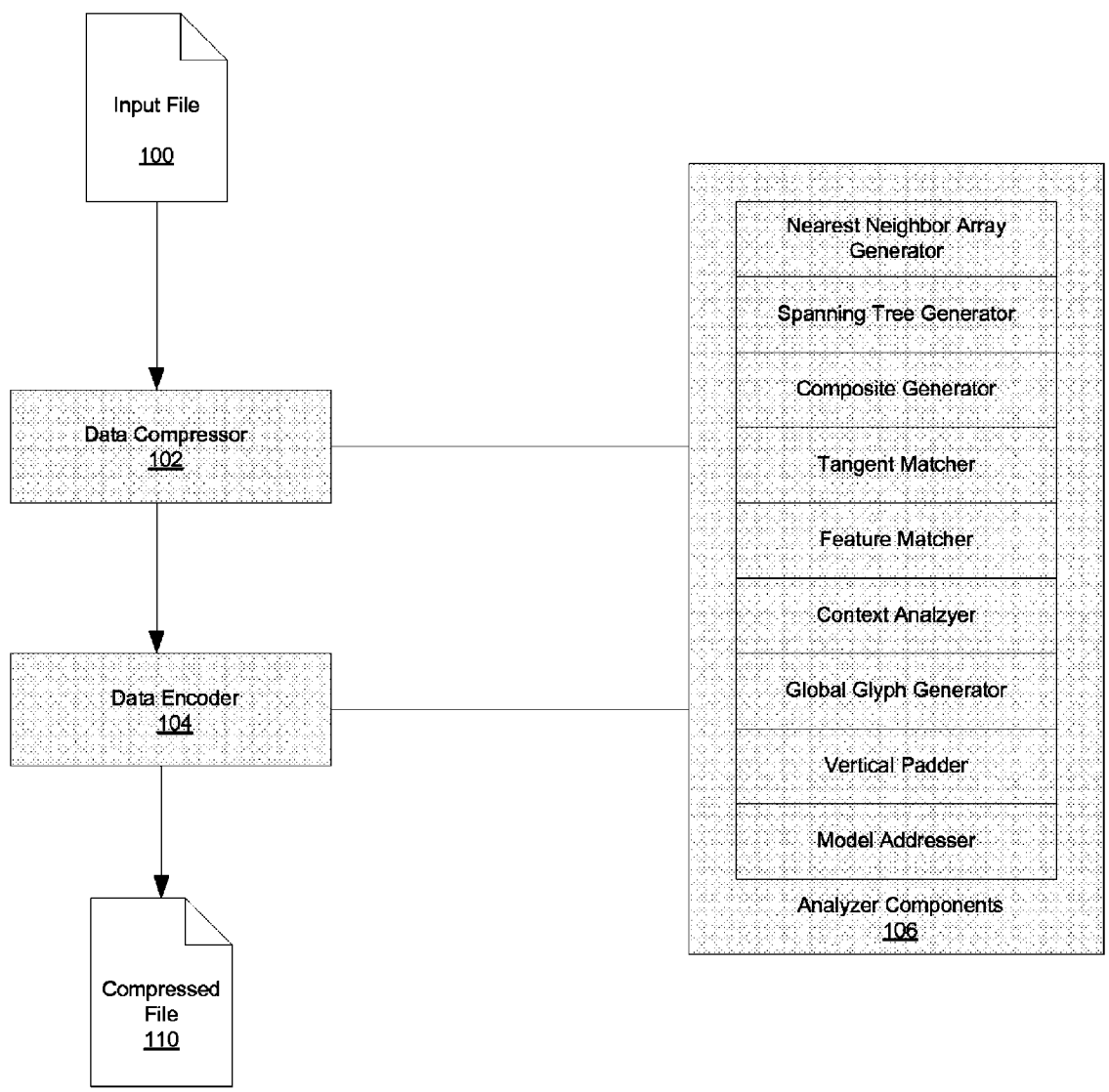
FIG. 1 is a block diagram that illustrates a data compressor and data encoder, according to an example embodiment of the present invention.

FIG. 1 shows an example data compressor 102 and data encoder 104 which may use analyzer (and/or generator) components 106 to generate a compressed file 110 which represents an input file 100. In an example embodiment of the present invention, the data compressor 102 may receive the input file 100, e.g., a file generated based on a scanned image and including glyphs. The data compressor 102 may analyze the glyphs to generate models, e.g., using some of the analyzer components 106. A number of similar glyphs or nodes may form a class associated with a single model. The data encoder 104 may generate a compressed representation of the file, a compressed file 110, based on the models generated by the data encoder 104 and some of the analyzer components 106. Models and addresses indicating positions for placement of the models on a page may be used as the compressed file 110. The compressed file 110 may be decompressed by placing the models in the indicated positions, thereby substantially regenerating the input file 100.

Determining Shape Similarity

In an example embodiment of the present invention, the system and method may increase efficiency by determining shape similarities of nodes. Based on shape similarity determinations, the system and method may decide whether to further compare two nodes. Accordingly, the shape similarity determinations may decrease the number of nodes to which a node is to be compared, e.g., using a matcher or other comparison.

The system and method may generate second order moments for each node in both the 'x' axis and the 'y' axis. In this regard, the system and method may determine a node's centroid, which is the position of the average position of all on pixels (e.g., black pixels) of the node, and which is considered its 0,0 position. The system and method may normalize all of the node's pixels relative to the centroid position. For example, if a non-centroid pixel's position along the 'x' axis is 24 and the centroid pixel's position along the 'x' axis is 16, then the normalized position of the non-centroid pixel along the 'x' axis is 24−16=8. For an axis, the system and method may generate the second order moment by obtaining the result of the equation $$\frac{\sum_{x=1}^{n} x^2}{n},$$

where x is the node's normalized position along the considered axis, and n is the number of the node's on pixels along the considered axis.

For each axis, after generating the second order moments for all of the considered nodes, the system and method may plot the second order moments in a histogram, where the x axis of the histogram corresponds to the generated second order moment values, and the y axis of the histogram corresponds to the number of nodes having that generated second order moment value. The values of such a histogram may be represented by the functions $H_x(z)$ and $H_y(z)$, corresponding to the number of nodes with z as the x second moment value, and y second moment value, respectively.

For every value z, the system and method may also generate a cumulative histogram $CH_x(z)$ (or $CH_y(z)$). In particular, $CH_x(z)=[H_x(z)+CH_x(z-1)]$, and $CH_y(z)=[H_y(z)+CH_y(z-1)]$. That is, $CH_x(z)$ value represents the number of nodes having a second order moment value less than or equal to z. For example, if 3 nodes have the second order moment value 1, 2 nodes have the second order moment value 2, and 5 nodes have the second order moment value 3 (all along the x axis), then the $H_x(1)=3$, $CH_x(1)=3$, $H_x(2)=2$, $CH_x(2)=5$, $H_x(3)=5$, and $CH_x(3)=10$.

Using the CH values, the system and method may divide nodes into a predetermined number of bins. For example, if the predetermined number is 10 and the number of nodes on the page is 5,000, the CH values may be used to divide the nodes into sets of 500 arranged in an array of 10 bins, e.g., 500 nodes per bin. Considering both the 'x' and 'y' axes, a two dimensional array of bins may be formed. Those nodes having most similar shapes according to the generated second order moments of both the 'x' and 'y' axes are grouped together in a single bin. Accordingly, the system and method may determine which nodes have similar shaped to a considered node, within a certain range of similarity based on their proximity to the considered node's bin.

Generating Shape Similarity Space

For solving certain shape similarity problems like K nearest neighbor and a shape similarity based MST, it is useful to have pre-computed a shape similarity space. To compute this space, the system and method may perform the following:

generate a moment profile per component (node or glyph) using $2^{nd}$ order moments or generate 12 moment profiles per component using three $2^{nd}$ order moments for each of 4 quadrants ($3^{rd}$ order moments can be used instead of or in addition to the $2^{nd}$ order moments);

generate a histogram in the 'x' and 'y' moment directions;

shift the bins' boundaries so that the distribution in each dimension is uniform at k-bins (exemplary preferable settings for k include 32, 16, and 8); and grid the moment space uniformly to form a shape similarity space, and put each node on its appropriate grid's linked list, based on its moment values.

Fast, Approximate K-Nearest Neighbors (AKNN)

AKNN may be used for lossless encoding. Matchers, discussed below, may be used for lossy encoding.

In an example embodiment of the present invention, after the system and method determines that two nodes have shape similarity, the system and method may then compare them to make sure that they are to be associated with a same model.

For example, for two letters, e.g., b and d, which have the exact same second order moments, the system and method may determine that they have shape similarities and therefore compare them. For the comparison, the system and method may overlay the considered two nodes by aligning them by their centroids. The system and method may XOR the aligned nodes. The XOR value (the number of pixels for which the XOR value is TRUE, i.e., the pixels at which the aligned nodes differ) may be considered the "distance" between the two nodes.

For each node, the system and method may perform the comparison of the node to at least a predetermined number of most similarly shaped nodes. If the total of nodes sharing the same bin as the considered node is less than the predetermined number, then the system and method may spiral out to the bins surrounding the already considered bins until the total nodes in all of the considered bins is at least the predetermined number. For example, if the predetermined number is 20 and only 5 other nodes share the same bin as the considered node, the system and method may compare the considered node to the nodes in the eight bins surrounding the already considered bin. If the total nodes of all nine considered bins is less than 20, the system and method may then compare the considered node to the nodes in the 16 bins surrounding the previously considered nine bins, etc. Once the predetermined number of nodes has been compared to the considered node, the system and method may cease spiraling outwards.

After comparing a node to at least the predetermined number of others determined to have similar shapes as described above, the system and method may find K closest neighbors to the considered node of the nodes of the considered bins.

In an alternative example embodiment of the present invention, instead of spiraling outward until at least the predetermined number of nodes are found for comparison with the considered node, the system and method may, after each spiral outward, compare the considered nodes to the other nodes of the considered bins and determine whether a predetermined number 'Z' of nearest nodes have changed. If the nodes belonging to the Z nearest have not changed, the system and method may cease spiraling outward. Otherwise, the system and method may continue to spiral outward until the nodes belonging to the group of Z nearest neighbors stops changing.

For example, after comparing the considered node to the nodes sharing the same bin as the considered node, the system and method may determine which Z of the other nodes are nearest to the considered node. Subsequently, the system and method may compare the considered nodes to those in the eight bins surrounding the considered node's bin. if any of the nodes of the eight surrounding bin are determined to be nearer to the considered node than the already determined Z nearest nodes, the constitution of the group of Z nearest nodes changes. Accordingly, the system and method may spiral outward to compare the considered node to nodes of still more bins.

Thus, for each node in an image, the system and method may find K-Nearest Neighbors by spiraling out, starting at a current grid location, until the considered node is compared to N closest nodes in grid space, e.g., where N=10, 100, 250, or 500, always updating the K-Nearest. When comparing actual shape distance, as an alternative to XOR, Hamming or 12 quadrant moments may be used.

Fast, Approximate Min Spanning Tree (MST) Using Shape Similarity Metric

For some characters, if the character is close enough to another character, it may be cheaper to encode a difference of the character from the closest other character if the characters are similar enough. Otherwise, it may be cheaper to encode the character from scratch. Conventional spanning trees relate to this principle. Example embodiments of the present invention provide efficient ways to generate a spanning tree.

In an example embodiment of the present invention, aside from XORing a considered node with the nodes of the surrounding bins as described above, the system and method of the present invention may additionally square the differences of the second order x of the considered node and the node to which it is being compared, square the differences of the second order y of the considered node and the node to which it is being compared, add the squares, and compute the square root of the result (Pythagorean theorem). The result may represent the difference in moment space between the two nodes. Different numbers of nearest neighbors may be computed using the two methods, XOR and moment space. For example, the system and method may determine the K nearest neighbors using XOR and the M closest using moment space.

After determining the M closest neighbors, the system and method of the present invention may build a spanning tree in an efficient manner. The system and method may begin with a first considered node, which the system and method may use as a first part of the tree. For each of the considered node's M nearest neighbors, the system and method may determine whether the neighbor has already been included in the tree. If the neighbor is not already in the tree, the system and method may compute the XOR value (which may have already been computed for determining the K closest nodes). The XOR value may be considered the cost of including the neighbor node as a variation of the already included node. If the cost is less than a predetermined threshold and is the cheapest as compared to costs of including the neighbor node as a variation of another node of the tree, then the node may be added as a variation of the considered node. Otherwise, if there is a cheaper cost for including the neighbor node as a variation of another node of the tree (which is less than the threshold), then the neighbor node may be included as a variation of that other node. If the cost of adding the neighbor node as a variation to any other node is above the threshold, the neighbor node may be added separately.

Accordingly, the system and method may compute for each node an M Nearest Neighbor structure with, e.g., M=100, 250, or 500. A two-dimensional array of nodes may be constructed, where index 'i' is of the array of all of the nodes, and index 'j' is of the array of M neighbors for each node[i].

The system and method may initially set each node i's cost of addition to the tree, $\Delta[i]$, as infinite. The system and method may construct a priority queue Q of nodes i according to its value $\Delta[i]$. The system and method may maintain a set of trees T.

The system and method may perform the following:

```
For each node i:
    Δ[i] = ∞;
End For
Δ[1] = 0;            //A first considered node's cost is initially set to 0, while all
                       others have been set as infinite//
While there are Nodes in Q:
    i = DeQueue(Q);  //this means that i is the index of the cheapest node in the queue
                       and the next node to be inserted into AMST T[t]//
    if (Δ[i] > treeThresh) t++;    //if distance exceeds treeThresh, then start new tree//
    insert(i, T[t]);              //insert the i^th node into the present tree node section//
```

```
For (j=1 to M):                              //find M nearest neighbors of node i //
    Let n_j be the i^th node's j^th nearest neighbor.
    if (n_j is not in T) Do:
        Let d = XOR(i,n_j)                   //Compute XOR distance between Nodes i and n_j//
        If (d < Δ[n_j]) Δ[n_j] = d;          //Update the cost of adding n_j to T[t] //
    End Do
End For
End While
```

Font Matching

Tangent-Based Matching

In an example embodiment of the present invention, the system and method may compare two nodes (also referred to as bitmaps or symbols) using a tangent matcher. A tangent matcher imposes certain constraints not imposed by conventional matchers. A tangent matcher is one having constraints regarding a pixel's tangent, i.e., an on pixel's bordering of an off pixel. That is, a tangent matcher requires the system and method to analyze a 3×3 surrounding a pixel. (A feature matcher, discussed below, may require analysis of an even larger window.) In one example embodiment, a range of tangent matchers may be used.

When two glyphs are given to a matcher, an alignment is used so that each pixel in one glyph has an equivalent pixel in the other glyph with the same positioning. Generally, the glyphs will be aligned by centroid, so that the centroid pixel of one glyph will have the equivalent position as the centroid pixel of the other glyph. Other alignments may include upper-left, whereby the top-left pixels of the two glyphs will have the same positioning. Pixels outside the bounding box of a glyph are considered to be off (or white). A matcher will require the two glyphs to match with the given alignment. If they don't match with a given alignment, additional alternative alignments may on occasion be used, until a match is found. If a pixel in one symbol cannot find what it needs in the equivalent pixel of the next symbol, it may look at those pixels which neighbor it. For example in a Hausdorff match, each black pixel must find a corresponding black pixel within distance one of its equivalent pixel.

Each pixel has four 4-neighbors, namely top, bottom, right, and left. It has eight 8-neighbors, which in addition to the 4-neighbors includes the top-left, top-right, bottom-left and bottom-right. If a black pixel has a white 4-neighbor, i.e., top, bottom, right, and/or left, it is referred to herein as a tangent pixel. Any two or more black pixels which share the same white 4-neighbors may be referred to as having the same tangent constraints. (When a black pixel contains more than one white 4-neighbor, we may require that all of these tangent constraints be satisfied, or we find it acceptable if one of these tangents constraints is satisfied.) A tangent matcher is one which checks whether the tangent pixels in one glyph can find corresponding pixels in the second glyph which satisfy their tangent constraints. These corresponding pixels must generally be within distance one of the (positionally) equivalent pixel, and there may be additional restrictions as to which direction they must be in. When a tangent pixel finds a corresponding pixel with the same tangent constraints, the latter may be said to be giving tangent support to the former. A tangent matcher therefore focuses on whether tangent pixels can find corresponding pixels which offer tangent support.

For example, a weak tangent matcher may be used which determines that for a pixel of a first bitmap, a second bitmap includes a corresponding pixel that is a match if the corresponding pixel shares one of the same tangent directions (e.g., where a pixel has up to four tangent directions, i.e., top, bottom, right, and left) as the pixel of the first bitmap. Pixels may be considered to correspond if their positions relative to their respective bitmaps are not offset by a certain number, e.g., 1. So, if a black pixel has a white neighbor above it and a white neighbor to its left, a weak tangent matcher would require that a corresponding black pixel be found in the second bitmap which shares one of the same tangent constraints. Namely, it must have a white pixel above it or to its left.

A stronger tangent matcher may determine a match where all tangent directions are matched. (However, if a pixel has four tangent directions, the pixel may be considered an isolated pixel so that no match is required). A tight tangent matcher may require that, if a pixel has two tangent directions, then the other bitmap must have a corresponding single pixel with the same two tangent directions. A loose tangent matcher may find a match where two pixels of the second bitmap, which are deemed to correspond to the considered pixel of the first bitmap include a first pixel having one of the tangent directions and a second pixel having the other tangent direction, even though a single pixel of the first bitmap has both tangent directions. (The tight and loose matchers may be considered sub-categories of the strong tangent matcher.)

Example criteria for determining which tangent matcher to use includes, but is not limited to, mean stroke thickness or height. For example, the thicker the stroke the weaker the tangent matcher can be. Stroke thickness can vary at different points on a considered character, so that the system and method may apply strong and weak tangent matchers at different points of the same character.

A neighbor supported matcher requires a match to be found for a pixel only if the pixel's tangent has support by its neighbor. If the pixel does not have support for its tangent, then the bitmaps may be determined to be a match even if no match is found for the pixel. Neighboring support is where the pixel's neighbor has a tangent in the same direction as the considered pixel.

Nevertheless, the neighbor supported tangent may be stronger in certain instances than the weak matcher. For example, where a pixel has a tangent in two directions, but neighbor support only in one direction, then the weak tangent matcher allows a match of tangent in either direction, but the neighbor supported matcher requires a match in the direction having the support.

In an example embodiment of the present invention, the system and method may perform accurate shape matching that determines when an object boundary has a well-defined tangent direction. If a tangent direction is detected in bitmap A, then the matching function may incorporate this constraint, e.g., bitmap B must have a corresponding boundary point with a corresponding tangent direction.

With respect to printed text, the system and method of the present invention may detect the contrast between the black foreground and the white background of the text. Not only are the black pixels detected, but how they relate to the surrounding white pixels are also detected. For example, for a bitmap of a first letter "p" with a mean stroke thickness of 2 and a second letter "p" at twice the height, width, and mean stroke of the first letter "p," while the second bitmap is much larger than the first bitmap, the two underlying letters are nevertheless the same because the two bitmaps share the same tangent directions.

Conventional JBIG2 matching relies on point set techniques which match pixels in one bitmap to corresponding pixels in another bitmap. While these techniques make sense intuitively and can be run very quickly, they don't capture the full subtlety of the human visual system. For example, the bitmaps shown in FIGS. 3, 5, and 7 differ from the bitmaps shown in FIGS. 2, 4, and 6, respectively, by only the few additional pixels marked by an X. For a point set matcher, these differences would be fairly insignificant and would generally not preclude a match. From a tangent perspective these bitmaps would be very different, and would generally not be allowed to match.

Tangent constraints may be imposed in addition to other point set techniques, such as Quadrant Hausdorff, or they may be used instead of them. This may depend on the nature of the bitmaps to be matched.

Tangent based matchers create a whole new breed of matchers. Just like point set matching led to a range of useful matchers, so too Tangent constraints enable a range of important new matchers. Different ones of the tangent matchers may be ideal for different types of bitmaps, as explained above. Some criteria have been set forth above, and additional exemplary criteria are discussed below.

In an example embodiment of the present invention, the system and method may utilize a Tangent Hausdorff matcher. A Weak Tangent Hausdorff matcher may require that every black pixel with a white four neighbor (i.e., directly above, below, left or right) in each bitmap must find a corresponding black pixel within a distance of one that shares one of the same white neighbors. A Weak Tangent Hausdorff matcher is tighter than a Hausdorff matcher, as it imposes additional tangent constraints.

A matcher which requires that every black pixel find a corresponding pixel that shares all of the same 8-neighbors may be called a $T_8$ matcher. One that requires that every black pixel find a corresponding pixel that shares the same 4-neighbors may be called a $T_4$ matcher. One that requires that every black pixel find a corresponding pixel that shares the same white 4-neighbors may be called a $T_{W4}$ matcher. One that requires that every black pixel find a corresponding pixel that shares one of the same white 4-neighbors may be called a $T_{W1}$ matcher. Consequently, a Weak Tangent Matcher may be referred to as a $T_{W1}$ matcher.

For very large bitmaps, the system and method may utilize a Rank Weak Tangent Hausdorff matcher. Just like a Rank 95 Hausdorff requires that 95% of the black pixels find a corresponding black pixel within a distance of one, a Rank 95 Weak Tangent Hausdorff requires that 95% of the black tangent pixels find a corresponding black pixel that shares a same tangent constraint within a distance of one.

For very small bitmaps, the system and method may utilize a Quadrant Tangent Hausdorff matcher. Just like a Quadrant Hausdorff matcher requires that every black pixel find a corresponding black pixel within the same quadrant, a Quadrant Tangent Hausdorff matcher requires that every tangent pixel find a corresponding black pixel with the same tangent constraints in the same quadrant.

In an example embodiment of the present invention, the system and method may utilize several tangent-based matching functions. They may differ primarily on how much of tangent support or a tangent match they require. Further, the conditions under which the tangent-based matching functions are used may differ. That is, while every tangent has a black pixel with a neighboring white four neighbor, not every tangent direction must necessarily be matched.

For example, a large bitmap with a mean stroke thickness greater than 4 may have a single white pixel in the middle of a black region due to a poor scan. It wouldn't make sense to require the four black neighbors who neighbor this white pixel to each find tangent support, thereby requiring a matching bitmap to have a single white noisy pixel within distance one. Therefore, for larger shapes, the system and method may provide that a match is required only for that which is determined to be a structural perimeter point, which is when if the white neighbor itself has a white neighbor (and for even larger bitmaps that it has two white four neighbors.)

The tangent matcher may also differ on the degree of match required for there to be a determination that corresponding pixels of two bitmaps match. For example, if a black pixel has two white neighbors, a Weak Tangent Matcher would consider one or more corresponding pixels of another bitmap to be a match as long as the matcher finds that the one or more corresponding pixels match the considered pixel in either one of its two tangent directions. A Strong Tangent Matcher may require a match for both of its tangent directions. A Tight Tangent Matcher may require a single corresponding pixel to match the considered pixel in both tangent directions. The same distinction may apply to a pixel with three white neighbors in three tangent directions.

The tangent matcher may also differ in where the tangent match must be found. For example, some may allow any corresponding match within distance one. Others may require the tangent match to be found in a pixel that is within a certain distance of the considered pixel in a specific direction. This will frequently be parallel to the tangent direction. For example, a black pixel with a white neighbor above it may require that its corresponding black pixel with a white neighbor above it of the second bitmap be either in the same exact position, or one pixel above or below it. If the only such pixel is to the right or the left, it will not be valid support.

One type of tangent matcher is a neighbor supported tangent matcher.

Neighbor Supported Tangent Matcher

In an example embodiment of the present invention, the system and method may use a neighbor supported tangent matcher which requires that, if a black pixel with a white four neighbor has an adjacent black four neighbor which shares a white neighbor in the same direction, then the corresponding matching bitmap must also have a black pixel with a white neighbor in the same direction, within distance one. For example, the bitmap shown in FIG. 8 includes a black pixel labeled X. The pixel X has a white neighbor above it (white delineated by O, black delineated by B), as does the black pixel to its left. The black pixel to its left supports the top tangent direction. Therefore, the neighbor supported tangent matcher requires that the second bitmap also have a black pixel within distance one that has a white neighbor above it. There is also a tangent to the right of pixel X, but, since there is no black 4 neighbor support for that tangent, the neighbor supported tangent matcher does not require a tangent match in that direction.

For most variations of the Tangent Matcher, a relatively small window surrounding the pixel will provide all the information needed to determine what type of support will be needed. For a Weak Tangent Matcher, only the values of the black pixel's four neighbors are needed. For a Neighbor Supported Tangent Matcher, only the value of the black pixel's eight neighbors are needed. Each of these lend themselves to a quick lookup table of acceptable pairs of windows.

Feature-Based Matching:

In an example embodiment of the present invention, the system and method may use a feature-based matcher. The feature-based matcher analyzes a window larger than the 3×3 surrounding the pixel. A feature-based matcher is one that chooses a particular matcher based on a "feature" found by the processor in the surrounding window.

In an example embodiment of the present invention, the system and method may use a non-feature-based matcher, e.g., one of the tangent matchers discussed above, for most of a considered character, and use a feature-based matcher for certain parts of the character belonging to a determined feature. The feature-based matcher may be used for those certain parts to ensure that the feature is included in the second bitmap for a determination to be made that the second bitmap matches the first bitmap (even though a weak matcher may have otherwise determined the pixels to be a match).

To make sure the feature is included, the feature-based matcher may compare the boundaries of the feature. For example, the structure shown in FIG. 9 may be considered to be less sharp than that of FIG. 10, such that the feature-based matcher may require a stricter matching criteria for the structure of FIG. 10 than that of FIG. 9.

Features that the system may match in the two bitmaps can include but are not limited to concavity, convexity, corner, curve, cusp, maxima, minima, polar maxima, polar minima, umbilic, and inflection.

The system and method of the present invention may require that, for every feature detected in shape A, a corresponding feature must be found in shape B.

One way to view a feature-based matcher is as a sophisticated hybrid tangent matcher. While they may each have different rules, a tangent matcher may require the same level of tangent match for every tangent pixel in the bitmap. A feature-based matcher may classify each black pixel with a white four neighbor into different feature classes, each of which may require different degrees of tangent match in different directions.

For example, while the black pixels marked X in FIGS. 9 and 10 each share the same tangents, the human visual system treats them very differently. The feature-based matcher of the present invention may take this into account. A feature-based matcher would allow the X in FIG. 9 to find a match to a corresponding pixel of a second bitmap having the same tangent in either direction, while the feature-based matcher may require the X in FIG. 10 to find a match only in a single pixel having both tangents.

Curvature-Based Matching

A curvature is wherever there is a consecutive directional shift in a same direction within a threshold number of pixels. In an example embodiment of the present invention, where there is such a shift, the system and method may require the same number of directional shifts in the same direction in the second bitmap within a tolerance of 1 for the second bitmap to be considered a match to the first bitmap. The tolerance of 1 may apply with respect to (a) the number of shifts and to (b) the position of where the shifts occur.

For example, as regards (a), if the source has 2 shifts, the destination can have one shift. As regards (b), the shift in the second bitmap can be one above or below the corresponding shift in the first bitmap if the shift is a horizontal one (and right or left if it is a vertical one).

The feature-based matcher may require that if the discrete curvature of shape A is locally well-defined then so must shape B have corresponding locally well-defined curvature that matches the curvature of A. A sequence of tangent directions on the boundary of A must have a matching sequence of tangent directions on the boundary of B. While this is a subcategory of a feature matcher, this can be viewed as a higher level tangent or feature matcher. It may not be sufficient for each local feature in A to find a corresponding feature in B. Rather, a set of neighboring features must all find supporting features that have the same relative positioning to each other. Alternatively, a set of neighboring tangents must all find tangent features that have the same relative positioning to each other.

For example, the 3 neighboring X pixels in each of FIGS. 14 and 15 have tangent support to the right, and if they were aligned properly each of the X pixels of one of the bitmaps of FIGS. 14 and 15 would find a match in the other of the bitmaps of FIGS. 14 and 15 within distance one. However, the relative positioning between the 3 Xs are very different in each of the bitmaps, and a curvature-based matcher may therefore reject the match.

Feature-based curvature matching is generally a way of implementing a farther reaching feature-based matcher. Other than requiring the feature-based matcher to analyze an overly large window, the feature-based curvature matcher may analyze a series of smaller windows and insist on maintaining the relationship between them.

Feature-Based Symmetry Matching

One kind of feature the feature-based matcher may consider is symmetry. In an example embodiment of the present invention, if a concavity or convexity is found, the system and method may determine whether the concavity or convexity is noise or, otherwise, significant. If the system and method determines that there is reflexive symmetry along the axis, the feature may then be considered significant.

The system and method may always look for symmetry (unless there is an extremely large stroke thickness). Whenever there is symmetry, the system and method may require a tangent match in all directions, (but will not require it by a single pixel, so that the second bitmap might have an X below the corresponding X besides the corresponding X and may still be considered a match.)

With respect to concavity, if a symmetrical concavity is found, the system and method may require the same in the second bitmap, and tangent matching would not necessarily be that which is used to ensure such a match. It may occur that the tangent matcher would find a match where the feature-based symmetry matcher does not.

A feature matcher will frequently require the matcher to look at a much larger window than the immediate eight neighbors of the bitmaps. An effective feature matcher has rules to know when a larger window is needed, as well as what shape and in which direction it must be in. The system and method may provide that the feature matcher search for certain precise predetermined properties in that window. While the human visual system regularly takes such information into account, the binary compression community has not taken such information into account. Instead, conventional systems stick to small local windows. Furthermore, considering such information is too tedious to be effectively solved using conventional systems. However, an example embodiment of the present invention provides for considering symmetry to take into account information of a large window.

If a structure (weaker than a feature) is detected in symmetry in shape A, then, even if based on local criteria there wouldn't appear to be a need for a feature match, the matcher may require a corresponding symmetric structure in shape B.

For example, FIG. 11 shows a thin vertical line with a stroke thickness of two, which has an extra black pixel on the right side. While all the pixels on the right side have tangent support to their right, this pixel also has tangent support above and below it. Considering the X pixel, without addressing it as a feature, a matcher would not require a corresponding pixel to also have tangent support above and below. On the other hand, FIG. 12 shows the same line except that the single X pixel has its tangent directions of above and below reinforced by a symmetrical pixel on the left side of the bitmap. Consequently, feature-based symmetry matching would require that both symmetrical pixels find a matching pixel tangent in a second bitmap for the above and below directions.

This rule requires the use of a much larger window than most matchers would consider. For example, with respect to the pixel marked X in FIG. 12, the white pixels which are four pixels to its left must be considered, as shown in FIG. 13.

Word Grouping, Learning, & Matching

Letters may get stuck together. Using a precise matcher, it may therefore occur that no match will be found for these letters. In an example embodiment of the present invention, the system and method may consider whole words as a unit and match words even where the component letters would not otherwise be separately matched.

The system and method may determine that a string of components is a word. To do so, the system and method may determine where there are lines of characters. For example, the system and method may search for black pixels with white pixels underneath the black pixels and count the number of such pixels in each row. The system and method may determine where the bottom of the line is based on peaks of the counted pixels at certain rows. The system and method may similarly count those black pixels having white pixels above for determining the tops of the lines. (Where the line is a vertical one, right and left, rather than top and bottom, may be considered.)

The processor may measure the distance between every two components on the line. The processor may then determine which two adjacent components' distance from each other is closer to an intra-word distance and which is closer to an inter-word distance. Those closer to intra-word may be determined to be of a same word. Others may be determined to be of separate words.

For each word, the processor may set a bounding box. Words may be considered candidate matches if they have a match of the bounding boxes, e.g., within two for height, width, and area of black pixels that are on. Depending on the stroke thickness, one of the matchers are run. (If thick enough then it is not a tangent matcher; if thinner, a the tangent matcher may be used, as discussed above.) However, when matching words, the processor may allow a match with some mismatch in certain positions determined to be a candidate for where two letters are connected.

To determine which positions are candidates, for every column (assuming the lines are horizontal), the system and method may count the number of black pixels that are on. If there is a minima (very few black pixels), e.g., as compared to other columns, then it is a candidate for having two letters stuck together at the column of the minima or within one column of the minima.

Word Groups

Conventional matching is done without merging or breaking nodes. This limits compression. Also, for other applications, such as OCR propagation, not learning across topological boundaries is a limiting factor. Word topology is highly reliable, meaning that segmenting words into word groups can be done with a high degree of reliability, regardless of the capture resolution, even at handheld device (e.g., cell phone) image capture rates. If word instances can be grouped reliably, then the system and method can learn word groups, meaning words that re-occur with high frequency, even if the topology of word instances within the word group is not constant, e.g., where the letters in one word bitmap are stuck together and the letters of another word bitmap are not stuck together.

Learning Word Classes

Conventional bitonal compression shape matchers do not match shapes with differing topology. Rather, they match single components against similar single components. In an example embodiment of the present invention, the system and method may implement a word matcher that does match across varying topology, thereby facilitating achieving human perceptual performance for learning the underlying font library and for propagating OCR-based information and constraints.

Piecewise TP Matching:

In the following, a component for which there is no match is referred to as a "residual component." The system and method of the present invention may allow such residual components and still consider the words to be a match if the residual components occur where there is a minima of black pixels.

Alternatively, for all of the residual pixels, the system and method may mark as single components each set of connected residual pixels. If the formed components are too large, i.e., the component includes more than a threshold number of pixels, then the system and method determines that there is no match. Otherwise, the system and method may perform the following:

determine whether the residual component has a width greater than a predetermined number of columns, e.g., 3, a match not being found if it is greater than the predetermined number of columns;

if the width is not greater than the predetermined number, count the number of consecutive columns each having within the column (in the considered line) one or more residual pixels and determine whether the number is greater than a predetermined number (which may be the same or different as the predetermined number of the previous step), in which case the words are not deemed to be a match;

if the number of consecutive columns is not greater than the second predetermined number, then determine whether separate occurrences of residuals occurs within a predetermined number (e.g., a third predetermined number) of columns, e.g., 8 columns;

if they occur within the predetermined number of columns, then the system and method may deem the words not to be matches, unless the separated residuals completely occur within a very small number of columns, e.g., 3 columns;

if they do not occur within the predetermined number of columns or otherwise occur completely within the small number of columns, then the residual components may be disregarded, and a match may be found despite the residual components.

Accordingly, the system and method may match two words as follows: treat each (multi-component) word as a "component" and use a Hausdorff distance 1 with tangent constraints as the metric; mark all pixels that do not match using this metric as residual and perform residual connected components on these pixels; if any residual connected component has an area exceeding a max then reject word match; otherwise, define a band image as an image with 3 columns and height equal to the word height; find a minimal set of bands that covers the residual connected components (min band cover); if these covering bands have a minimal distance dmin from each other, e.g., dmin>=8, then the words are allowed to match, else they are not; if the words match, their corresponding models are allowed to match.

The compression system and method may learn word groups and all the corresponding models within a word group may be merged together. This also allows the system and method to break component models where some word instances have separate models and some instances have topologically connected models.

Word grouping: 2 cases i. where the text direction is known.

The system and method of the present invention may group page so that text direction is running horizontally and sweep page from left to right into text segments. These basic line groupings can be extended by connecting line segments together. Once a line segment has been found, the interletter and interline distances may be solved for. With these two distances d1 and d2 computed, the line segment can be divided into words.

ii. where text direction is unknown.

The system and method of the present invention may perform word grouping in a manner that does not depend on line finding. First, for each component, its Cartesian k nearest neighbors may be found, where 'k' is typically 5 and nearest neighbor is measured using Euclidean distance between corresponding centroids. A grid may be overlayed on the image, where each grid square is a pointer to a linked list. In this way, each component is put onto a linked list. A component's nearest neighbor (NN) components may be found by checking the considered component's list and neighboring grid lists.

Once a component's NN is found, the components may be linked together if their positions are sufficiently close to each other. This usually means their respective bounding boxes are within a few pixels. When NNs are allowed to link they form a subline. Additional connected components can link to a subline if this link is consistent in direction (orientation) and interletter distance with the existing subline.

Font Matching Speedup Using AKNN Data Structure

AKNN is an array of nearest neighbors for each node as described above (built, for example, using XOR). Although the XOR and moment-based methods of matching may have been performed, these matching methods generally do not perform as an exact a matching as do the matchers. Therefore, even after finding nearest neighbors, the system and method of the present invention may run a matcher on the nearest neighbors.

The first nearest neighbor may have already found a matching model or may be a model. Therefore, the system and method may initially attempt to match the considered node to the model with which its nearest neighbor is associated. If the neighbor was not already matched to a model and is not a model, then the system and method may move on to the next neighbor. This is a routine that should have the speed of the first fit but accuracy of a best fit methods for finding a matching model. That is, this method may increase efficiency, since the likelihood of finding a match with one of the initially considered models is increased.

Accordingly, an AKNN data structure may be generated before attempting font learning.

Instead of conventional first fit matching or best fit matching the system and method may rely on nearest neighbor matching. Thus, the system and method may first compare the given node or model to its nearest node or model to see if it matches. If it does not, the system and method may compare to the $2^{nd}$ nearest neighbor.

The AKNN data structure (ds) is originally computed for the nodes (or cc's). It can then be iteratively recomputed after each matching iteration for the current set of models.

Font Consistency Checking

In an example embodiment of the present invention, where a node's nearest neighbor is of a different model than is the presently considered node, the system and method may form a new model based on the present node, as follows.

For Font Consistency Checking, the system and method may run regular Matcher( ), where all nodes are matched to a model. Using AKNN, the system and method may determine font consistency for each model M. A model M is defined as consistent exactly when for each node associated with the model, its k nearest neighbors (NNs) are all associated with model M, for some k, e.g., k=3, k=5, or k=10. (Alternatively, k may be computed as a percentage, e.g., 30%, of the number of nodes associated with the model M.)

Where j is index through number of models, for every single model, i is an index through all nodes in a given model (a class of nodes that may be slightly different but have been matched and are grouped together to form a model), and N is the number of models, then if node n[i] in model M[j] has a NN in model M[k], and j!=k, then:

```
N++;                                          // add to the number of models.//
let n[i] form basis of new model class N;
for all nodes l in M[j]
    if (cDist(n[l], M[N]) < cDist(n[l], M[j])
        ClusterMove(n[l], j,N);               //if the node of the previously
                                              considered model is actually closer to
                                              the newly for all nodes l in M[k]
                                              model, then change the model to which
                                              it belongs.//
    if (cDist(n[l], M[N]) < cDist(n[l], M[k])
        ClusterMove(n[l], k,N);
```

This font consistency check may avoid mismatches.

Font Model Reduction Using AKNN

In an alternative example embodiment of the present invention, if a node's nearest neighbor is of a different model than the considered node, the system and method may join the two models together, instead of creating a new model. Whether to use one or the other can be set by the user, but the creation of a new model is safer but more expensive.

With respect to this second approach, there are some safety measures as to when to apply it. For example, a safety measure may be to compare the two models themselves to each other using a very loose matcher and require to find a match. Alternatively, a safety measure may be to require that the nodes themselves match using a regular matcher for merging the models.

Accordingly, the system and method may use computed fast approximate nearest neighbors (AKNNs) to reduce font models. Specifically, if font model p includes a node j whose $k^{th}$ nearest neighbor 1 belongs to font model m then merge models p & q. Alternatively, merge models p and q assuming the Hausdorff distance H(p, q)<=1 or H(p, q)<=2. Alternatively, merge models p and q assuming nodes j and 1 match each other with the regular matcher.

The method for reducing font models using approximate K nearest neighbor is as follows (in the following k_nn[ ] is an array where k_nn[i,j] is the node index of the $i^{th}$ node's $j^{th}$ nearest neighbor):

For each node i in a given image:

```
set k=10;
{
    for j = 1 to k {
        if ( p = model_class(node[i]) and
             q = model_class(node[k_nn[i, j]]) and
             p<>q )
             if H(p, q) <= d // d is typically 1 or 2
                 merge_models(p, q);
    }
}
```

Method for Reducing Number of Font Models Using Cartesian Product

In an example embodiment of the present invention, the system and method may first match nodes to create models and then match each created model to all other models. If they are matched, they are merged; otherwise they remain separate models. Then the system and method may match each node of each of models determined to be relatively close to each other (but not determined to have been matched) to the nodes of the other of the models determined to be relatively close to each other. If they are matched, then the models are joined together (even though the models themselves did not match each other).

The Cartesian product approach is meant to reduce the fragmentation in a font model set under construction. The Cartesian product of two sets is used here to identify possible model merging that should occur. In particular, for example, where the system and method is in the process of font learning and currently have n font models, then a method to further reduce the number of models is as follows:

```
For i = 1 to n                              //iterate through all models
    For j = 1 to n                          //iterate through all models
        If (i != j)
            if H(i, j) <= d                 // d is typically 1 or 2
                For k = 1 to num_nodes(i)
                    For l = 1 to num_nodes(j) {   //iterate through cartesian product of
                                                  nodes
                        Node_index1 = Model_Node(i, k)   //returns index of k^th node belonging to
                                                         i^th model
                        Node_index2 = Model_Node(j, l)   //returns index of l^th node belonging to j^th
                                                         model
                        If Node_Match(Node_index1, Node_index2)
                            merge_models(i, j);
```

Maximal Entropy Cluster Probing (MECP):

If a conventional system is working on page 2 of a document and has already solved everything in the first page, font learning is performed again in the second page anew. The following is a new fast way of processing a page 2.

In an example embodiment of the present invention, the system and method may compare each character of the second page to existing models and determine to which model, if any, the character belongs.

The system and method may use hashing for this purpose. Hashing is, for example, where a value is entered into a function and a remainder number of the result of the function is recorded—only a few records would be mapped to a particular hash value. Therefore, a new entry need be checked only against a subset of all of the existing records. In the case of the example embodiment of the present invention, the system and method may use a hashing function to match the characters of the second page to the models generated based on the first page.

The following may be used as the hashing function:

All models that have been generated may be stacked. Figuratively speaking, a pin may be entered into the models to determine which pixels vary the most between the models. If a pixel is almost always white through all models, then the system and method may ignore it. The closer it is to 50/50, the better it is for the system and method to consider. Clusters may then be formed on the basis of such pixels. For example, if 50% of the stacked models are black with respect to a particular pixel, then that pixel may be used to narrow the number of possible model matches to 50% of the total. Then with another pixel, the system and method may break the selected cluster down to further clusters. The system and method may keep probing until one model remains.

(Note that some pixels of the models are gray which means that the pixel varies between the nodes of the model. Gray pixels of the model may therefore be ignored.)

First the probes to be used are determined. Then for each character we the probes are applied to do the narrowing down.

Once the one model to which it can belong is determined, if it actually belongs to the model may be determined by looking at the gray scale model having black, white, and gray. The processor may determine that the node matches the model if all on pixels (black) of the node map to on pixels or gray pixels of the model, and all off pixels of the node map to off or gray pixels of the model.

Sometimes, where there are not enough nodes to rely on the grayscale model, then the following may be performed: mark all black boundary pixels and all white boundary pixels as a gray pixel. A black boundary pixel is one that borders on a white and a white boundary pixel is one that borders on a black. Then the system and method may do the same as above.

A Maximal Entropy Model (MEM) may be used to determine which pixels form the smallest set of pixels that can be used to probe the models to always narrow down to one.

Accordingly, it is desirable to establish a set of pixels such that the size of the pixel set is at a minimum. The set points are given by their (xi, yi) geometric locations, every pixel in the set assigned a value V(xi, yi) of either ON or OFF, and for a given learned font, each Boolean assignment uniquely identifying a digitized symbol in the alphabet.

Purpose of maximal entropy coding: To find a hashing function that, in some constant time, maps a bitmap to a page-based or global font library. Typically, hashing functions are not used in the imaging domain. Even though hashing functions are very useful in other areas, like fast string searching, the imaging domain is non-deterministic so that hashing is typically very difficult.

In the case of maximal entropy coding, a grayscale library is first computed, consisting of all font bitmaps in the given regions (e.g., this page, across k pages). Initially, all the font symbols (i.e., bitmaps) are in one cluster. At each iteration the system and method goes to the largest cluster and finds a pixel, white or black but not gray, such that it breaks the cluster into as even a set of subclusters as possible. For an alphabet of k symbols, no more than k−1 probes are required. This set of probes finds a minimal set of pixels with respective Boolean assignments of ON and OFF that uniquely identifies every symbol in the font library. This minimal Boolean assignment is the font hashing function that can be used both for fast matching and fast ASCII OCR assignment.

Fast Font-Based Image Hashing

Hashing is a technique that has been used extensively in dictionary and database construction, but has not been used extensively in computer vision and image processing due to the non-deterministic nature of imaging and document capture.

In an example embodiment of the present invention, image hashing may be used as an effective tool for compression, OCR, and other applications. A resolution is selected across the document, e.g., 300 dpi. For this resolution, it is assumed that most picture objects will preserve their shape under basic morphological operations of erosion and dilation. The purpose of this method is to find similar image objects and can be applied to all kinds of image objects including fonts, logos, etc.

After processing k pages of a document, close to the complete library of picture objects, or actually the complete library of picture objects, for this document may have been computed. Nevertheless, there may be some additional picture objects, but it is not known when or where they might occur.

The hashing function may be perfect, that is collision free, and also minimal if possible, where the size of the hash table and font library are both m. A minimal perfect image hashing function can be constructed as follows:

Assume a perfectly calibrated imaging environment. Then each node or model instantiation must be within a Hausdorff 1 distance of any other model instantiation. Let us assume that a well-digitized, static library resolution can always be found that is topologically well-behaved (TWB). A library is TWB whenever the erosion of foreground does not change the topology of the foreground and, similarly, for the background. If a library violates this assumption, the resolution of all picture objects in the library may be doubled until this assumption is satisfied. Alternatively, a library is geometrically well-behaved GWB whenever the erosion of foreground is a Hausdorff distance 1 match with the original foreground and, similarly, for the background.

So having normalized the original font library so that it is TWB (alternatively, GWB), a minimal set of image points that discriminate between each element in the library may be found. Such a set of points can always be found provided the interior (i.e., a black pixel surrounded by black pixels) and exterior (i.e., a white pixel surrounded by white pixels) points for each font image are distinct. This discriminating set of points is the image hashing function for the library. Since the size of the alphabet is m, and the number of bin slots in the hashing function is m, and the function is always collision free, the hashing function is minimal and perfect.

Once the font library has been hashed, we can process the document, identifying each node's possibly matching model in constant time. This is also useful for very fast OCR. For each node, use the hashing function to identify the model class. Then reference the model in JBIG2 coding, or propagate the OCR mapping. It is assumed that when the library is static, no new models need to be learned.

Fast Model Verification Method for Hashing-Based Global Model Matching

Matching on a page once a font library is known is very different from matching when a font is being learned dynamically. Let's assume that for most documents the font can be learned in a fraction of the total pages in the document.

Using maximal entropy cluster probing (MECP), we can hypothesize that a connected component on the current page belongs to a certain font model. For each global font model, we have computed a tri-value grayscale map, where each pixel is ON, OFF, or gray. If a pixel is ON, then all node instances of this model have this pixel turned ON. If a pixel is OFF, then all node instances of this model have this pixel turned OFF. If a pixel is GRAY then some node instances matching this model have this pixel turned OFF, while other node instances have this pixel turned OFF.

To test (verify) that this node matches to a given global font model we check each node pixel against the grayscale model image. Each pixel ON in the node image can map to either an ON or GRAY pixel in the grayscale image, but not to an OFF pixel. Similarly, each pixel OFF in the node image can map to either an OFF or GRAY pixel in the grayscale image, but not to an ON pixel.

Fast Verification of Page Node Against Global or Page Grayscale Font Model it is desirable to use as few computer cycles as possible. In addition to the grayscale, the system and method of the present invention may create an on image map and off image map. In the on map all the gray is assigned an on value; in the off map, all the gray is assigned an off value. So every model will have an additional two models—on and off.

The system and method may use these two maps for the comparison of the nodes to the models as set forth below.

Using MECP, we can hypothesize that a node is a digitized instance of a font model. But testing of this conjecture is necessary. To that end, each font model has a grayscale image map that has been computed. In addition to the grayscale map, we also compute an ON map and an OFF map. The ON image map for a given model is binary, and is stored as an array of ID row arrays or vectors. To compute a model's binary ON image, each ON or GRAY pixel in the grayscale image is assigned a binary ON value in the binary ON map. To compute a model's binary OFF image, each OFF or GRAY pixel in the grayscale image is assigned a binary OFF value in the binary OFF map.

Verification of a row of pixels in a node image consists of two steps:

i. all ON pixels in the node vector must be covered with supporting ON pixels in the binary (thresholded) ON image, and ii. all OFF pixels in the node vector must be covered with supporting OFF pixels in the binary (thresholded) OFF image To verify the ON pixels in a row of the node image, the row is ANDed with the binary ON row computed from the grayscale model image. The current node vector (row) ANDed with the binary ON row equals the current node vector exactly when the binary ON row covers all the ON pixels in the node row, which is step i. above. This verification can be done, for bitmaps with up to 64 columns, in a single clock cycle. Similarly, to verify that the OFF pixels in a row of the node image are correct, the node vector is ORed with the corresponding row of the binary OFF map. The current node vector ORed with the binary OFF row equals the current node vector exactly when the binary OFF row covers all the OFF pixels in the node row, which is step ii. above. This second verification can be done, for bitmaps with up to 64 columns, in a single clock cycle. Total verification time is on the order of two clock cycles.

If the node does not match using this test, then we run a regular matcher for the node to the model. If it passes, then the model is updated to account for the new node, and the node is set to belong to the model.

If it fails the matcher's test, then the node is compared to other nodes on the page and assigned to the model of the node to which the considered node is matched.

If there is no way to join a node into an existing model, then a new model will be made.

Method for Computing Global Font Models

For multipage documents, additional compression is attained using global models. This allows sharing font models across pages. The method for obtaining global models is to have a dynamic global font library. Once the font models for a given page have been computed, these models are matched against the current global font library. Each page model that matches a global model is removed from the page models and the corresponding global model is referenced instead. If a specific page model is not in the global model library (i.e., does not match a global mode) but has sufficient frequency on this page or other characteristics of a well-behaved font model, then it is added to the global font library. Characteristics of a well-behaved font model can include, but are not limited to, the height, width, area or median stroke size of this model being closely aligned with corresponding values of other known font models.

Method for Computing Composite Font Models

Use of word modeling for matching purposes has been described. Further, in an example embodiment of the present invention, some composites of nodes may be used as an additional model for the compressed representation of the input file. For example, "ing" or "th" might be such composites. The following is an algorithm for determining which composites are worth generating as a new model in view of its saving overall characters being sent over.

Symbol addressing within JBIG2 is not that efficient. Thus, many bytes can be taken up in addressing within the symbol stream. One way to reduce addressing costs is to form composite models, thereby reducing the number of symbols in the addressing stream. Composite models are efficient when models repeatedly occur together in a certain sequence. These composites can be formed using a greedy algorithm, as described below.

Find the most common co-occurrence of models in the symbol stream with the same relative pixel positioning. (In one embodiment, a small tolerance of one pixel is allowed in the vertical or horizontal directions). If that number of co-occurrences is above a certain threshold, create a new composite model that consists of a reference to each of those two symbols with their relative positioning. Replace all instances of these two models that are within a tolerance of their relative pixel positioning in the symbol stream. Treat this new composite as any other symbol, and proceed to find the new most common co-occurrence of models in the symbol stream. Iterate until the most common co-occurrence is no longer greater than the replacement threshold.

Method For Computing Global Composite Font Models

There are times when the composite model should be made available for referencing locally on the present page and then other times where it makes sense to include it in a global table of models for referencing by other pages. (The cost of entering in the global table after the composite has in any case been sent is that the index size of the global table is increased). The benefit of referencing the same global composite by other pages rather than for each separate page may be weighed against the cost of the increased index size. Thus, the system and method of the present invention may determine whether the benefit of including the composite in the global table outweighs the cost. The way this is determined may be by determining that the number of times the composite occurs across all pages is above a threshold. However, even in this case, the system and method may refrain from including it in the global table, unless each component model of the composite has also been determined to be included in the global table. For example, for "th" to be included, it may be required for there to have been a determination that "t" and "h" should be included in the global table.

Just as composite models can reduce addressing costs when applied locally, so global composites can also reduce per page addressing. The method for computing global composite models is very similar to computing page-based composites. The algorithm is also greedy. It relies on a 2-pass approach, where after the $1^{st}$ approach the global font models for the document are known. In the $2^{nd}$ pass, global composites are constructed in a greedy manner. The method for building up the global composite dictionary is the same as the one used for local composites, but the co-occurring symbols must both be global models or composites. Additionally, we may require that the global composites appear on more than one page of the document.

Context-Sensitivity

Model matching is generally done with respect to two models A and B. Additional compression is achieved using context-sensitive matching.

Two context sensitive methods:

1. If two models almost match then we consider "context." If 2 models almost match and they share intra-word left or right models, then the system and method may allow the models to match using a looser matcher and merge their models. Depending on the properties of models, "almost match" can mean within a tangent-based Hausdorff distance 1 under translation, a neighbor supported tangent match, or some other matcher looser than that which would otherwise have been used on these two models.

Alternatively, it may be required that the intra-word left or right models each have the same relative vertical and horizontal positioning. This means that if in one case the neighbor to the right is x number of pixels away and in the second case it is fewer number of pixels away then, if the difference is above a certain threshold then the system and method would not apply the looser matcher.

Alternatively, it may be required that the models share both intra-word left and right models.

Alternatively, the number of models they share to the right or to the left may help determine which looser matcher they must satisfy in order to be merged.

2. In a $2^{nd}$ implementation of context-sensitive matching:

In an example embodiment of the present invention, strings of a predetermined size may be matched to all strings of the same size, e.g., on a page, using a looser than regular matcher. For example, if a substring str1 has 3 consecutive image nodes u1 v1 w1 in a document, and a $2^{nd}$ substring str2 has 3 consecutive image nodes u2 v2 w2 in the same document, where both str1 and str2 are intra-word strings, then if str1 and str2 have a match, e.g., component-wise tangent-based Hausdorff distance 1 under translation (an exemplary looser matcher), the system and method of the present invention may then merge corresponding component models P1 Q1 R1 and P2 Q2 R2.

Improvements in Bitmap Encoding

Efficient Lossless Encoding Using Approximate, Min Spanning Forest or Approximate K Nearest Neighbors When encoding any given node in the compressed file representing an original input file, the coding provides for analyzing the neighboring pixels to determine a probability of the pixel being black or white; the greater the probability is one way or the other, the fewer bits required for the encoding. Further, if there is a similar bitmap that can be used, then the probabilities are further enhanced based on the similar bitmap. But if a bitmap which is very dissimilar is used, then use of the bitmap can have the reverse effect. Accordingly, in an example embodiment of the present invention, the system and method may determine whether a bitmap is close enough such that it can be expected on average to save bytes. In this regard, the system and method may account for that a saving for the presently considered bitmap might actually cause a loss for other bitmaps.

In this regard, JBIG2, for example, allows clairvoyant encoding, whereby a node may be encoded with the context of its own already encoded pixels, as well as the pixels of another already encoded node. When the two nodes are similar to each other, such encoding can be cheaper than encoding the node explicitly (i.e., without the help of a second node). However, if the nodes are different enough from each other, encoding the node clairvoyantly can increase file size. While, for each node, the system and method may find the closest node already encoded in an XOR sense, the system and method may further provide a fast heuristic to determine whether to encode a respective node using that nearest neighbor or otherwise explicitly.

Accordingly, the system and method may count the number of XOR pixels between the considered node and its nearest neighbor that has already been encoded. Subsequent to the counting, the system and method may add to the total: (a) a multiple of the absolute difference in height between the two compared nodes; and (b) a multiple of the absolute difference in width. The system and method may determine whether the sum is less than a certain predetermined percentage of the number of pixels in the node to be encoded (the total number of pixels calculated, e.g., as the width times height of the node). If it is determined that the sum is less than the percentage, then the system and method may conclude that the node is to be encoded clairvoyantly, using the other node as a reference. Otherwise, the system and method may conclude that the node is to be encoded explicitly with no such referencing. It is noted that in lossless encoding, each node is encoded, rather than models of the nodes.

A preferred embodiment of this is to use a Min Spanning Tree (MST), and to encode the nodes in the order in which they joined this MST. Each node may then be encoded with its parent node in the MST serving as a reference node, if it passes the test explained in the previous paragraph.

Improvements in JBIG2 Addressing

Vertical Padding

When encoding glyphs in the compressed representative file, the system and method may include in the file a set of models and indications of where the models are to be placed. For example, vertical position of the model may be encoded by an indication of the position at which the bottom-left of the bitmap is to be placed. (Variations may be used in which other positions of the bitmap are used. The vertical padding may be similarly applied when the variations are used. Similarly, while vertical positioning is described, the same principles may be applied to horizontal positioning, e.g., where glyphs are arranged in vertical lines.)

Conventionally, where a line of glyphs include a plurality of consecutive glyphs having the same vertical position, for efficient encoding, the vertical position of the first glyph is provided with an indication that it is to be applied to following glyphs as well. Further, in an instance where a word, such as "merge," having characters of different height, is encoded, two alternative encoding methods are used. According to one method, using the example of the word "merge," the vertical value of the first character would be indicated, then the shift down for the letter 'g' would be indicated, and then the shift back up to the regular line height of the majority of the letters would be indicated. According to the alternative method, the symbols will be ordered so that whenever possible, consecutive symbols will have the same vertical position. Therefore, those symbols having the first vertical position would be given, followed by those with the second position. For example, the coding would first provide the vertical positioning of "mer e" temporarily skipping the 'g' and returning to it later.

In an example embodiment of the present invention, the system and method may further increase efficiency in such an instance of a string of glyphs having different heights. The system and method may increase the height of the bitmaps of the shorter characters, e.g., with additional off pixels, so that the bitmaps have the same height as the taller bitmaps. For example, in the case of the word "merge," the system and method may increase the height of the bitmaps for the letters 'm,' 'e,' and 'r' (the bitmap of 'e' is referenced twice). Accordingly, the same lower-left vertical position may be used for all of the glyphs of the line. Various criteria may be used to determine when such size increase is more efficient that an increased number of vertical position encodings. For example, where the number of additional bytes used for the increased bitmaps is more that than the number of additional position references, then it may be determined that the increased bitmaps is not to be used. The ratio of glyphs to models may be used as a heuristic to determine whether vertical padding can be expected to save bytes.

A descendor is a symbol whose bottom position is below that of other symbols on line, such as 'g' or 'p.' An ascendor is a symbol whose top position is above that of other symbols on line, such as a capital letters or numbers. When the symbols are encoded using the bottom-left or bottom-right, the blank rows of padding will be applied to the bottom of the bitmaps, giving all the symbols on the line the same bottom positioning of the descendors. When the symbols are encoded using the top-left or top-right, the blank rows of padding will be applied to the top of the bitmaps, giving all the symbols on the line the same top positioning as the ascendors. Even when it is not possible for every glyph on the line to have the same exact vertical positioning, the use of vertical padding can save bytes by reducing the range in vertical positioning between symbols.

In this regard, considerable byte cost in JBIG2 and any similar bitonal compression codec is required for addressing. This cost can be reduced by padding the letters so that linear text, incurs less of a vertical shift cost between consecutive symbols, which can often occur when descenders are adjacent to non-descenders. An advantage of padding a font to uniform vertical height is that the vertical shift addressing cost is reduced.

In fact, it can help reduce horizontal addressing costs as well. Normally in JBIG2 coding it is required to encode the full horizontal distance from the corner of one node to the same corresponding corner of the next node, so that the full distance of a node plus the interletter distance between the two nodes must be encoded. However, if two adjacent nodes have the same vertical position, JBIG2 allows for encoding the interletter distance between the two nodes, which in addition to being smaller is likely to have a more uniform value, and is therefore cheaper to encode. Enabling more nodes to have the same vertical positioning can therefore also reduce the horizontal addressing cost of the JBIG2 encoding.

An example embodiment of the present invention is directed to a processor, which may be implemented using any conventional processing circuit, e.g., a Central Processing Unit (CPU) of a Personal Computer (PC), to execute code provided, e.g., on a hardware-implemented computer-readable medium, to perform the example methods described above, or portions thereof. The hardware-implemented computer-readable medium may be implemented as a memory device, which may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a hardware-implemented computer readable medium having stored thereon instructions, which, when executed, cause a processor to perform the example methods described above, or portions thereof.

An example embodiment of the present invention is directed to a method of transmitting instructions executable by a processor, the instructions, when executed, causing the processor to perform the example methods described above, or portions thereof.

Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented symbol matching method, comprising:
   determining, by a computer processor, which pixels of a first symbol are tangent pixels;
   for each of the determined tangent pixels, determining, by the processor, whether a second symbol includes a pixel corresponding to the tangent pixel that includes at least one same tangent constraint as that of the tangent pixel;
   accepting, by the processor, the first and second symbols as a match based on shared tangent constraints conditional upon a determination that the second symbol includes for each of at least a subset of the tangent pixels of the first symbol a corresponding pixel that includes the at least one same tangent constraint as that of the tangent pixel; and
   generating, by the processor, a document including a single symbol that is mapped to the first and second symbols.

2. The symbol matching method of claim 1, wherein the accepting of the match is conditional upon that, for each of the at least a subset of the tangent pixels of the first symbol, a corresponding pixel of the second symbol is determined to include all tangent constraints of the tangent pixel.

3. The symbol matching method of claim 1, wherein the accepting of the match is responsive to a determination that the second symbol includes for each of the at least a subset of the tangent pixels of the first symbol a corresponding pixel that includes one or more same tangent constraints.

4. The symbol matching method of claim 1, wherein the subset includes only tangent pixels neighbored by another tangent pixel that has at least one same tangent constraint as that of the tangent pixel.

5. The symbol matching method of claim 1, wherein pixels of the first and second symbols correspond if they are not offset from each other by more than one with respect to their respective bitmaps.

6. The symbol matching method of claim 5, wherein the acceptance of the first and second symbols as a match based on shared tangent constraints is condition upon that, for each of the at least the subset of the tangent pixels, the corresponding pixel that includes the at least one same tangent constraint as that of the tangent pixel is not offset from the tangent pixel in a direction that does not parallel a tangent direction of the tangent pixel.

7. The symbol matching method of claim 1, wherein a number of shared constraints required for acceptance of the first and second symbols as a match based on the shared constraints depends on a height, width, and a mean stroke thickness.

8. The symbol matching method of claim 1, further comprising:
   for each of the at least a subset of the tangent pixels:
      analyzing eight pixel neighbors of the tangent pixel; and
      determining, based on the analysis of the eight pixel neighbors, a number of the at least one same tangent constraint required for use of the constraint similarity between the tangent pixel and its corresponding pixel as a basis for accepting the first and second symbols as a match.

9. The symbol matching method of claim 1, further comprising:
   for each of the at least a subset of the tangent pixels:
      determining whether the first symbol includes another pixel that is symmetric to the tangent pixel with respect to an axis; and
      determining, based on the determination regarding the inclusion of the symmetric pixel, a number of the at least one same tangent constraint required for use of the constraint similarity between the tangent pixel and its corresponding pixel as a basis for accepting the first and second symbols as a match.

10. The symbol matching method of claim 1, wherein the symbol matching method is used for data compression.

11. The method of claim 1, wherein the acceptance of the first and second symbols as a match is further conditional upon that said first and second symbols are a Hausdorff match.

12. The method of claim 1, wherein the acceptance of the first and second symbols as a match is further conditional upon that said first and second symbols are a Quadrant Hausdorff match.

13. The method of claim 8, further comprising:
for each of the at least a subset of the tangent pixels, determining, based on the analysis of the eight pixel neighbors, a direction in which its corresponding pixel must be found.

14. The method of claim 8, wherein, for two neighboring tangent pixels in the first symbol, the accepting is conditional upon that the second symbol includes two corresponding neighboring tangent pixels, such that a relative positioning of the two neighboring tangent pixels of the second symbol is the same as a relative positioning of the two neighboring tangent pixels of the first symbol.

15. The method of claim 8, wherein, for two neighboring tangent pixels in the first symbol, the accepting is conditional upon that the second symbol includes two corresponding neighboring tangent pixels, such that a relative positioning of the two neighboring tangent pixels of the second symbol is the same, within a predetermined tolerance range, as a relative positioning of the two neighboring tangent pixels of the first symbol.

16. A computer system comprising:
a processor configured to perform symbol matching by:
determining which pixels of a first symbol are tangent pixels;
for each of the determined tangent pixels, determining whether a second symbol includes a pixel corresponding to the tangent pixel that includes at least one same tangent constraint as that of the tangent pixel;
accepting the first and second symbols as a match based on shared tangent constraints conditional upon a determination that the second symbol includes for each of at least a subset of the tangent pixels of the first symbol a corresponding pixel that includes the at least one same tangent constraint as that of the tangent pixel; and
generating a document including a single symbol that is mapped to the first and second symbols.

17. The system of claim 16, wherein the accepting of the match is conditional upon that, for each of the at least a subset of the tangent pixels of the first symbol, a corresponding pixel of the second symbol is determined to include all tangent constraints of the tangent pixel.

18. The system of claim 16, wherein the accepting of the match is responsive to a determination that the second symbol includes for each of the at least a subset of the tangent pixels of the first symbol a corresponding pixel that includes one or more same tangent constraints.

19. The system of claim 16, wherein the subset includes only tangent pixels neighbored by another tangent pixel that has at least one same tangent constraint as that of the tangent pixel.

20. A non-transitive hardware computer-readable medium having stored thereon instructions executable by a processor, the instructions which, when executed by the processor, cause the processor to perform a symbol matching method, the method comprising:
determining which pixels of a first symbol are tangent pixels;
for each of the determined tangent pixels, determining whether a second symbol includes a pixel corresponding to the tangent pixel that includes at least one same tangent constraint as that of the tangent pixel;
accepting the first and second symbols as a match based on shared tangent constraints conditional upon a determination that the second symbol includes for each of at least a subset of the tangent pixels of the first symbol a corresponding pixel that includes the at least one same tangent constraint as that of the tangent pixel; and
generating a document including a single symbol that is mapped to the first and second symbols.

* * * * *